United States Patent
Morioka

(10) Patent No.: US 8,264,776 B2
(45) Date of Patent: Sep. 11, 2012

(54) LENS ARRAY APPARATUS

(75) Inventor: Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 13/175,695

(22) Filed: Jul. 1, 2011

(65) Prior Publication Data

US 2011/0261463 A1    Oct. 27, 2011

Related U.S. Application Data

(62) Division of application No. 12/383,409, filed on Mar. 24, 2009, now Pat. No. 8,000,017.

(30) Foreign Application Priority Data

Mar. 25, 2008    (JP) .................................. 2008-077662

(51) Int. Cl.
   *G02B 27/10* (2006.01)
(52) U.S. Cl. ........................................ 359/626; 359/619
(58) Field of Classification Search .......... 359/618–619, 359/626, 624, 628
   See application file for complete search history.

(56) References Cited

U.S. PATENT DOCUMENTS

| 5,822,125 A | * | 10/1998 | Meyers ......................... 359/621 |
| 6,771,426 B2 | | 8/2004 | Yamamoto et al. |
| 2002/0093723 A1 | | 7/2002 | Okayama |

FOREIGN PATENT DOCUMENTS

JP    2004-138982 A    5/2004

* cited by examiner

*Primary Examiner* — Ricky Mack
*Assistant Examiner* — Zachary Wilkes
(74) *Attorney, Agent, or Firm* — DLA Piper LLP (US)

(57) ABSTRACT

A lens array apparatus and a manufacturing method thereof are provided in which in the lens array apparatus includes a predetermined angle of gradient in relation to a thickness direction for each of a plurality of lenses, an exiting direction of light emitted from each lens is at an angle of gradient allowing respective converging points of the light emitted from each lens to be positioned on a predetermined straight line that corresponds to each lens and is parallel with the thickness direction, under a plurality of different ambient temperatures.

4 Claims, 12 Drawing Sheets

LENS ARRAY APPARATUS

This is a 37 CFR §1.53(b) divisional application of application Ser. No. 12/383,409 of Mar. 24, 2009 which is hereby incorporated in its entirety by reference.

BACKGROUND OF THE INVENTION

1. Field of the Invention

The present invention relates to a lens array apparatus and a manufacturing method thereof. In particular, the present invention relates to a lens array apparatus including a plurality of lenses arrayed in a predetermined array direction and a manufacturing method thereof. The lens array apparatus is suitable for allowing each lens to emit incoming light towards a predetermined converging point.

2. Description of the Related Art

Conventionally, in the field of optical fiber communication and the like, a lens array is used in which a plurality of lenses are arrayed in a predetermined array direction.

In this type of lens array, for example, a light-emitting device in which a plurality of vertical cavity surface emitting lasers (VCSEL) are arrayed as light-emitting elements is disposed such that each VCSEL faces each lens. As a result, light emitted from each VCSEL enters each lens. Each lens emits the incoming light towards a predetermined converging point.

Then, at the converging point, the light emitted from each lens enters an optical device disposed on a light-emission side the lens array, such as a light-receiving device (for example, a photodetector) including an optical fiber and a plurality of light-receiving elements.

Patent Literature 1: Japanese Patent Laid-open Publication No. 2004-138982

As shown in FIG. 15, in a conventional lens array 1, each VCSEL 2 of the light-emitting device is disposed on a center axis 5 of each lens 3. The light emitted from each lens 3 advances in a direction perpendicular to the array direction (horizontal direction in FIG. 15).

Therefore, when the lens array 1 is made of a material that easily expands due to heat, as a result of heat expansion of the lens array 1 accompanying a change in ambient temperature, as shown in FIG. 15, a position of a converging point P' of the light emitted from each lens 3 may become significantly displaced in the array direction of the lenses 3 from a design position P.

When the converging point is displaced in the array direction in this way, a problem occurs in the optical device (optical fiber 6 in FIG. 15) on the emission side of the lens array 1 in that the light emitted from the lens array 1 cannot be appropriately received.

SUMMARY OF THE INVENTION

Therefore, the present invention has been achieved in light of the above-described issues. An object of the present invention is to provide a lens array apparatus and a manufacturing method thereof in which the lens array apparatus can achieve appropriate optical performance regardless of a change in ambient temperature.

In order to achieve the aforementioned object, a lens array apparatus according to a first aspect of the present invention includes a lens array including a plurality of lenses formed such as to be arrayed in a predetermined array direction and formed to have a predetermined thickness in a thickness direction that is perpendicular to the array direction. The lens array emits light that has entered the plurality of lenses and corresponds to each lens from each lens towards a predetermined converging point. The lens array apparatus also includes a light-emitting device that is disposed in a position facing the lens array in the thickness direction and on which a plurality of light-emitting elements of a same number as a number of lenses are formed. The light-emitting elements respectively emit light corresponding to each lens towards the plurality of lenses. In the lens array apparatus, as a predetermined angle of gradient in relation to the thickness direction for each lens, an exiting direction of light from each of the plurality of lenses is at an angle of gradient allowing a converging point of the light emitted from each lens to be positioned on a predetermined straight line that corresponds to each lens and is parallel in the thickness direction, under a plurality of ambient temperatures.

In the first aspect of the present invention, the converging point of the light emitted from each lens in the lens array is formed to be positioned on a straight line that corresponds to each lens, under different ambient temperatures. Therefore, appropriate optical performance can be achieved, regardless of changes in the ambient temperature.

A lens array apparatus according to a second aspect of the present invention is the lens array apparatus according to the first aspect, in which each center axis of the plurality of lenses is formed parallel with the thickness direction. The exiting direction is at the angle of gradient by the plurality of light-emitting elements being formed such as to be displaced by a predetermined displacement amount in the array direction from each center axis of the plurality of lenses.

In the second aspect of the present invention, each light-emitting element is formed such as to be displaced by a predetermined displacement amount in the array direction from the center axis of each lens. Therefore, the converging point of the light emitted from each lens can be positioned on the straight line corresponding to each lens under a plurality of ambient temperatures. As a result, appropriate optical performance can be achieved with a simple configuration, regardless of changes in the ambient temperature.

A lens array apparatus according to a third aspect of the present invention is the lens array apparatus according to the first aspect, in which each of the plurality of lenses has a lens surface on a light-entering side facing the light-emitting element and a lens surface on a light-exiting side opposing the lens surface on the light-entering side. The exiting direction is at the angle of gradient by each of the plurality of lenses being formed such that a predetermined displacement amount in the array direction is present between a center axis of the lens surface on the light-entering side and a center axis of the lens surface on the light-exiting side.

In the third aspect of the present invention, a predetermined displacement amount in the array direction is present between the center axis of the lens surface on the light-entering side and the center axis of the lens surface on the light-exiting side for each lens. Therefore, the converging point of the light emitted from each lens can be positioned on the straight line corresponding to each lens under a plurality of ambient temperatures. As a result, appropriate optical performance can be achieved with a simple configuration, regardless of changes in the ambient temperature.

A lens array apparatus according to a fourth aspect of the present invention is the lens array apparatus according to the first aspect, in which the exiting direction is at the angle of gradient by each center axis of the plurality of lenses being formed at the angle of gradient in relation to the thickness direction.

In the fourth aspect of the present invention, the center axis of each lens is formed at the angle of gradient in relation to the thickness direction. Therefore, the converging point of the light emitted from each lens can be positioned on the straight line corresponding to each lens under a plurality of ambient temperatures. As a result, appropriate optical performance can be achieved with a simple configuration, regardless of changes in the ambient temperature.

A lens array apparatus according to a fifth aspect of the present invention is the lens array apparatus according to any one of the first to fourth aspects, in which a light-receiving device is disposed in a position on a light-exiting side of the lens array. The light-exiting side is a side from which light from the plurality of lenses exits. The light-receiving device includes a plurality of optical fibers of a same number as a number of lenses into which light emitted from each lens respectively enters. Alternatively, the light-receiving device includes a plurality of light-receiving elements of a same number as a number of lenses that receive light emitted from each lens.

In the fifth aspect of the present invention, the light emitted from the light-emitting elements can be appropriately coupled with the optical fibers or the light-receiving elements, regardless of changes in the ambient temperature.

A manufacturing method for a lens array apparatus according to a sixth aspect of the present invention is a manufacturing method for a lens array apparatus that includes a lens array including a plurality of lenses formed such as to be arrayed in a predetermined array direction and formed to have a predetermined thickness in a thickness direction that is perpendicular to the array direction. The lens array emits light that has entered the plurality of lenses and corresponds to each lens from each lens towards a predetermined converging point. The lens array apparatus also includes a light-emitting device that is disposed in a position facing the lens array in the thickness direction and on which a plurality of light-emitting elements of a same number as a number of lenses are formed. The light-emitting elements respectively emit light corresponding to each lens towards the plurality of lenses. In the manufacturing method for a lens array apparatus, as a predetermined angle of gradient in relation to the thickness direction for each lens, an exiting direction of light from each of the plurality of lenses is at an angle of gradient allowing a converging point of the light emitted from each lens to be positioned on a predetermined straight line that corresponds to each lens and is parallel in the thickness direction, under a plurality of different ambient temperatures.

In the sixth aspect of the present invention, the converging point of the light emitted from each lens in the lens array is positioned on a straight line that corresponds to each lens, under different ambient temperatures. Therefore, the lens array apparatus can achieve appropriate optical performance regardless of changes in the ambient temperature.

A manufacturing method for a lens array apparatus according to a seventh aspect of the present invention is a manufacturing method for a lens array apparatus according to the sixth aspect, in which each center axis of the plurality of lenses is formed parallel with the thickness direction. The exiting direction is at the angle of gradient by the plurality of light-emitting elements being formed such as to be displaced by a predetermined displacement amount in the array direction from each center axis of the plurality of lenses.

In the seventh aspect of the present invention, each light-emitting element is formed such as to be displaced by a predetermined displacement amount in the array direction from the center axis of each lens. Therefore, the converging point of the light emitted from each lens can be positioned on the straight line corresponding to each lens under a plurality of ambient temperatures. As a result, the lens array apparatus can achieve appropriate optical performance with a simple configuration, regardless of changes in the ambient temperature.

A manufacturing method for a lens array apparatus according to an eighth aspect of the present invention is a manufacturing method for a lens array apparatus according to the seventh aspect, in which, from a coefficient of temperature dependence of refractive index and coefficient of linear expansion of a material forming the lens array, an amount of change in the thickness direction of a position of each converging point of the plurality of lenses accompanying a predetermined temperature change and an amount of change in a distance of each center axis of the plurality of lenses from a reference surface of the lens array accompanying the predetermined temperature change are determined. The reference surface is perpendicular to the array direction. For each of the plurality of lenses, a right triangle is assumed of which two sides are a first side that is parallel with the thickness direction and has a length equivalent to the amount of change in the position of the converging point and a second side that is parallel with the array direction and has a length equivalent to the amount of change in the distance of the center axis. An angle formed by a hypotenuse of the right triangle and the thickness direction is determined for each lens. A displacement amount is determined for each of the plurality of light-emitting elements corresponding to each lens. The displacement amount allows an exiting direction of the light from each of the plurality of lenses to be at the angle determined for each lens in relation to the thickness direction, towards a direction in the array direction counter to a heat expansion direction of the lens array. Each light-emitting element is disposed such as to be displaced by the determined displacement amount.

In the eighth embodiment of the present invention, each light-emitting element can be accurately displaced by a predetermined displacement amount in the array direction from the center axis of each lens. Therefore, optical performance can be enhanced, and cost can be reduced.

A manufacturing method for a lens array apparatus according to a ninth aspect of the present invention is a manufacturing method for a lens array apparatus according to the sixth aspect, in which each of the plurality of lenses has a lens surface on a light-entering side facing the light-emitting element and a lens surface on a light-exiting side opposing the lens surface on the light-entering side. The exiting direction is at the angle of gradient by each of the plurality of lenses being formed such that a predetermined displacement amount in the array direction is present between a center axis of the lens surface on the light-entering side and a center axis of the lens surface on the light-exiting side.

In the ninth aspect of the present invention, a predetermined displacement amount in the array direction is present between the center axis of the lens surface on the light-entering side and the center axis of the lens surface on the light-exiting side for each lens. Therefore, the converging point of the light emitted from each lens can be positioned on the straight line corresponding to each lens under a plurality of ambient temperatures. As a result, the lens array apparatus can achieve appropriate optical performance through use of a simple method, regardless of changes in the ambient temperature.

A manufacturing method for a lens array apparatus according to a tenth aspect of the present invention is a manufacturing method for a lens array apparatus according to the ninth aspect, in which a design lens array is assumed that is used to design the lens array in which a predetermined displacement amount is present between the center axis of the lens surface on the light-entering side and the center axis of the lens surface on the light-exiting side. The design lens array is made of a same material as that of the lens array. The design lens array includes a plurality of lenses arrayed in a predetermined array direction and having a predetermined thickness in a thickness direction that is perpendicular to the array direction. In the design lens array, the center axis of the lens surface on the light-entering side and the center axis of the lens surface on the light-exiting side of each lens match. From a coefficient of temperature dependence of refractive index and coefficient of linear expansion of the material forming the assumed design lens array, an amount of change in the thickness direction of a position of each converging point of the plurality of lenses in the design lens array accompanying a predetermined temperature change and an amount of change in a distance of each center axis of the plurality of lenses from a reference surface of the design lens array accompanying the predetermined temperature change are determined. The reference surface is perpendicular to the array direction. For each of the plurality of lenses in the design lens array, a right triangle is assumed of which two sides are a first side that is parallel with the thickness direction and has a length equivalent to the amount of change in the position of the converging point and a second side that is parallel with the array direction and has a length equivalent to the amount of change in the distance of the center axis. An angle formed by a hypotenuse of the right triangle and the thickness direction is determined for each lens. A displacement amount is determined for each lens. The displacement amount allows an exiting direction of the light from each of the plurality of lenses in the design lens array to be at the angle determined for each lens in relation to the thickness direction, towards a direction in the array direction counter to a heat expansion direction of the lens array. A positional relationship between the center axis of the lens surface on the light-entering side and the center axis of the lens surface on the light-exiting side in the design lens array is adjusted to have the determined displacement amount. As a result, the lens array having the displacement amount between the center axis of the lens surface on the light-entering side and the center axis of the lens surface on the light-exiting side is designed. The lens array is formed based on a design result.

In the tenth aspect of the present invention, a predetermined displacement amount in the array direction is accurately present between the center axis of the lens surface on the light-entering side and the center axis of the lens surface on the light-exiting side of each lens, through use of a simple method. Therefore, optical performance can be further enhanced, and cost can be reduced.

A manufacturing method for a lens array apparatus according to an eleventh aspect of the present invention is a manufacturing method for a lens array apparatus according to the sixth aspect, in which the exiting direction is at the angle of gradient by each center axis of the plurality of lenses being formed at the angle of gradient in relation to the thickness direction.

In the eleventh aspect of the present invention, the center axis of each lens is at the angle of gradient in relation to the thickness direction. Therefore, the converging point of the light emitted from each lens can be positioned on the straight line corresponding to each lens under a plurality of ambient temperatures. As a result, the lens array apparatus can achieve appropriate optical performance through use of a simple method, regardless of changes in the ambient temperature.

A manufacturing method for a lens array apparatus according to a twelfth aspect of the present invention is a manufacturing method for a lens array apparatus according to the eleventh aspect, in which a design lens array is assumed that is used to design the lens array in which the center axis is at the angle of gradient in relation to the thickness direction. The design lens array is made of a same material as that of the lens array. The design lens array includes a plurality of lenses arrayed in a predetermined array direction and having a predetermined thickness in a thickness direction that is perpendicular to the array direction. In the design array, the center axis of each lens is parallel with the thickness direction. From a coefficient of temperature dependence of refractive index and coefficient of linear expansion of the material forming the assumed design lens array, an amount of change in the thickness direction of a position of each converging point of the plurality of lenses in the design lens array accompanying a predetermined temperature change and an amount of change in a distance of each center axis of the plurality of lenses from a reference surface of the design lens array accompanying the predetermined temperature change are determined. The reference surface is perpendicular to the array direction. For each of the plurality of lenses in the design lens array, a right triangle is assumed of which two sides are a first side that is parallel with the thickness direction and has a length equivalent to the amount of change in the position of the converging point and a second side that is parallel with the array direction and has a length equivalent to the amount of change in the distance of the center axis. An angle formed by a hypotenuse of the right triangle and the thickness direction is determined for each lens as the angle of gradient. An angle of each center axis of the plurality of lenses in the design lens array is adjusted to allow an exiting direction of the light from each of the plurality of lenses in the design lens array to be at the angle of gradient determined for each lens in relation to the thickness direction, towards a direction in the array direction counter to a heat expansion direction of the lens array. As a result, the lens array in which the center axis is at the angle of gradient in relation to the thickness direction is designed. The lens array is formed based on a design result.

In the twelfth aspect of the present invention, the center axis of each lens can accurately be at a predetermined angle of gradient in relation to the thickness direction. Therefore, optical performance can be further enhanced, and cost can be reduced.

A manufacturing method for a lens array apparatus according to a thirteenth aspect of the present invention is a manufacturing method for a lens array apparatus according to any one of sixth to twelfth aspects, in which a light-receiving device is disposed in a position on a light-exiting side of the lens array. The light-exiting side is a side from which light from the plurality of lenses exits. The light-receiving device includes a plurality of optical fibers of a same number as a number of lenses into which light emitted from each lens respectively enters. Alternatively, the light-receiving device includes a plurality of light-receiving elements of a same number as a number of lenses that receive light emitted from each lens.

In the thirteenth aspect of the present invention, the light emitted from the light-emitting elements can be appropriately coupled with the optical fibers or the light-receiving elements regardless of changes in the ambient temperature.

Effect of the Invention

In the lens array apparatus and the manufacturing method thereof of the present invention, appropriate optical performance can be achieved regardless of changes in ambient temperature.

DETAILED DESCRIPTION OF THE PREFERRED EMBODIMENT

First Embodiment

A lens array apparatus and a manufacturing method thereof according to a first embodiment of the present invention will be described with reference to FIG. 1 to FIG. 10.

(Configuration of the Lens Array Apparatus)

Figure 1:
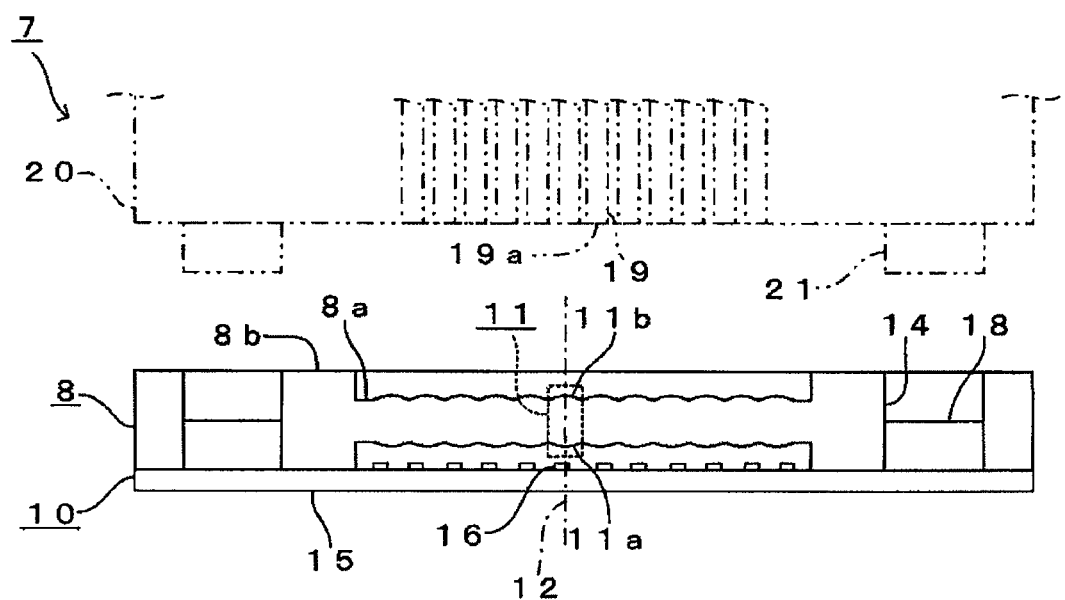
FIG. 1 is a configuration diagram of a lens array apparatus according to a first embodiment of the present invention.

As shown in FIG. 1, a lens array apparatus 7 according to the first embodiment includes a lens array 8 and a light-emitting device 10 attached to the lens array 8.

The lens array 8 is described in further detail as follows. As shown in a planar view in FIG. 2, the lens array 8 includes a plate-shaped lens forming section 8a having a roughly rectangular planar shape and a frame section 8b surrounding the lens forming section 8a in four directions. The frame section 8b is thicker than the lens forming section 8a. More specifically, as shown in FIG. 1 and FIG. 3, both end surfaces (top end surface and bottom end surface in FIG. 3) of the frame section 8b in the thickness direction are positioned on outer sides of the lens forming section 8a in the thickness direction.

Figure 2:
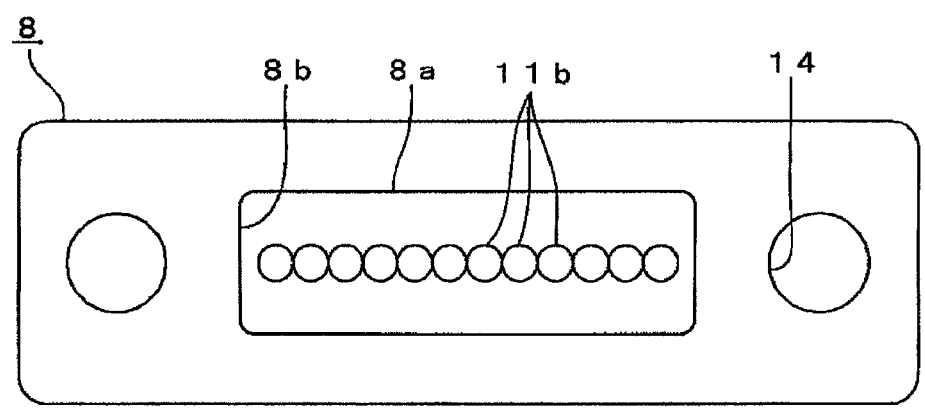
FIG. 2 is a planar view of a lens array in the lens array apparatus according to the first embodiment of the present invention.
Figure 3:
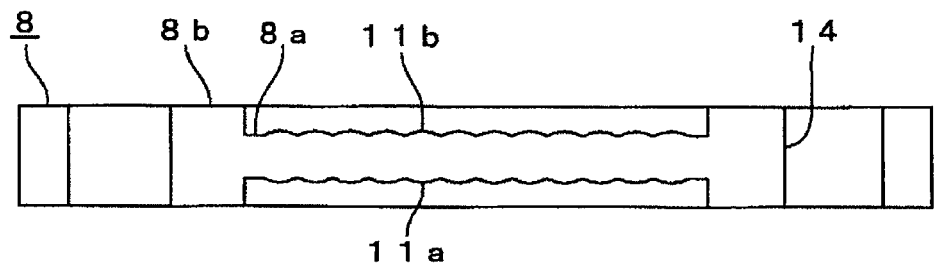
FIG. 3 is a vertical cross-sectional view of the lens array in the lens array apparatus according to the first embodiment of the present invention.

As shown in FIG. 1 to FIG. 3, a plurality of lenses 11 (12 lenses in FIG. 1 to FIG. 3) are formed in the lens forming section 8a, arrayed along a horizontal direction in FIG. 1 to FIG. 3 that is a predetermined array direction.

Each lens 11 has a predetermined thickness in the thickness direction (vertical direction in FIG. 1 and FIG. 3) perpendicular to the array direction. A lens surface 11a on a light-entering side facing the light-emitting device 10 and a lens surface 11b on a light-exiting side opposing the lens surface 11a in the thickness direction have a common center axis 12. In other words, the center axis 12 of the lens surface 11a and the center axis 12 of the lens surface 11b match. The center axis 12 is parallel with the thickness direction. The lens 11 according to the first embodiment is a bi-convex lens having a circular planar shape.

Light emitted from the light-emitting device 10 and corresponding to each lens 11 enters each lens 11 via the lens surface 11a on the light-entering side. The light entering each lens 11 is emitted from the lens surface 11b on the light-exiting side towards a predetermined converging point corresponding to each lens 11.

A pair of hole sections 14 penetrating the frame section 8b in the thickness direction are formed on the frame section 8b. The hole sections 14 are used to position the light-emitting device 10 when the light-emitting device 10 is attached to the lens array 8 and to position an optical fiber 19 when the optical fiber 19, described hereafter, is attached to the lens array 8.

A lens array 8 such as this can be integrally formed by an efficient manufacturing method using an inexpensive material, such as injection-molding of a resin material using a mold.

As shown in FIG. 1, the light-emitting device 10 includes a flat semiconductor substrate 15. A same number of vertical cavity surface emitting lasers (VCSEL) 16 as the number of lenses 11 are formed on a surface of the semiconductor substrate 15 that faces the lens array 8, along the array direction of the lenses 11. The VCSEL 16 serves as a light-emitting element. Each VCSEL 16 emits light corresponding to each lens 11 towards a corresponding lens 11.

A pair of projection sections 18 are disposed on the semiconductor substrate 15 in positions facing the pair of hole sections 14 on the lens array 8. The projection sections 18 project towards the lens array 8 side in a thickness direction of the semiconductor substrate 15. The projection sections 18 respectively engage with the hole sections 14 of the lens array 8. As a result, the projection sections 18 are used to position the light-emitting device 10 when the light-emitting device 10 is attached to the lens array 8.

Moreover, as shown in FIG. 1, when the light-emitting device 10 is attached to the lens array 8, the surface of the semiconductor substrate 15 facing the lens array 8 is in contact with an end surface of the frame section 8b facing the light-emitting device 10. The light-emitting device 10 is disposed in a position facing the lens array 8 in the thickness direction.

On the other hand, as shown in FIG. 1, according to the embodiment, a same number of optical fibers 19 as the number of lenses 11 are attached to positions on the light-exiting side of the lens array 8 from which light exit the lenses 11. The optical fibers 19 are arrayed along the array direction of the lenses 11. A portion on an end section side of each optical fiber 19 in FIG. 1 is held within a multi-core bundled connector 20.

Light emitted from the lens surface 11b on the light-exiting side of the lens array 8 enters each end surface 19a of the optical fibers 19. Each optical fiber 19 transmits the light entering from the lens array 8 side to a transmitting destination.

A pair of projection sections 21 that are long in the thickness direction in FIG. 1 are disposed in positions on the connector 20 facing the pair of hole sections 14 of the lens array 8. The projection sections 21 respectively engage with the hole sections 14 in the lens array 8. As a result, the projection sections 21 are used to position the optical fibers 19 when the optical fibers 19 are attached to the lens array 8.

In this way, the lens array 8 according to the first embodiment can optically couple the plurality of VCSEL 16 in the light-emitting device 10 and the respective end surfaces 19a of the plurality of optical fibers 19 corresponding to each VCSEL 16.

The lens array apparatus 7 according to the first embodiment has a basic configuration such as that described above. In the lens array apparatus 7, as a predetermined angle of gradient in relation to the thickness direction for each lens 11, an exiting direction of the light emitted from each lens 11 is at an angle of gradient allowing respective converging points of the light emitted from each lens 11 to be positioned on a predetermined straight line 23 that corresponds to each lens 11 and is parallel with the thickness direction, under a plurality of different ambient temperatures.

Moreover, according to the first embodiment, the angles of gradient in relation to the thickness direction regarding the exiting direction of the light emitted from each lens 11 such as these are actualized because each VCSEL 16 is displaced in the array direction from the center axis 12 of each lens 11 corresponding to each VCSEL 16 by a predetermined amount.

Figure 4:
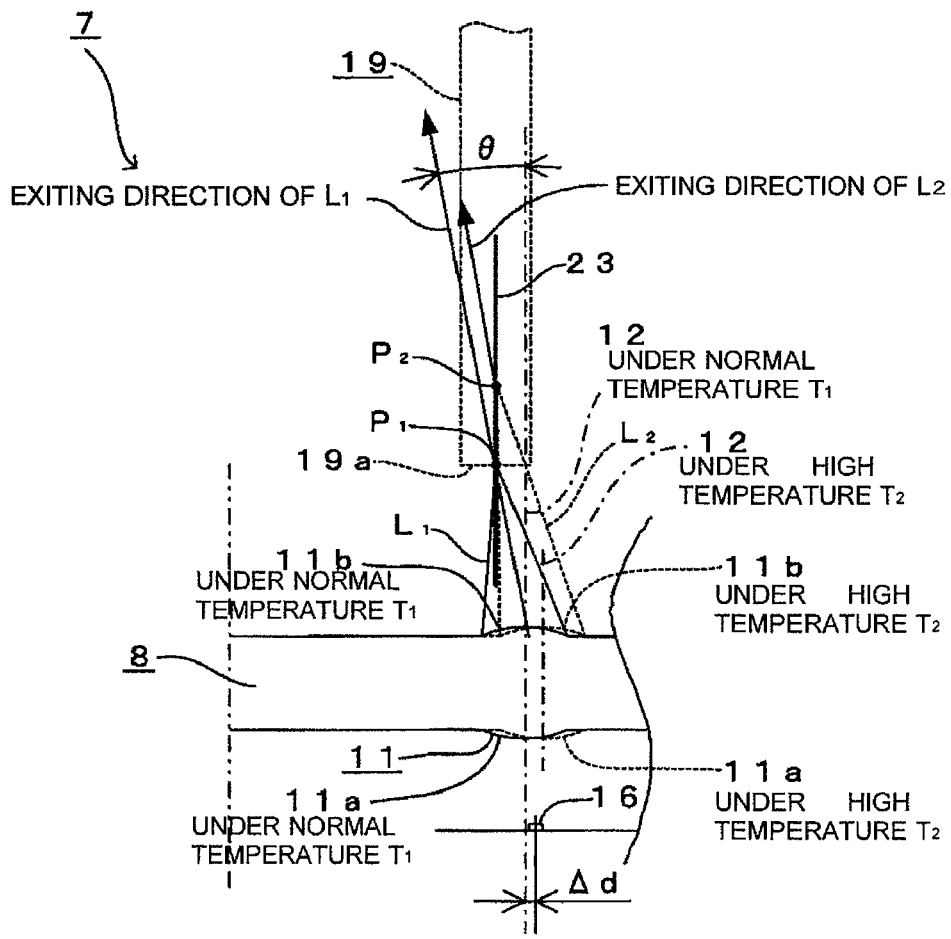
FIG. 4 is an explanatory diagram of main components of the lens array apparatus according to the first embodiment of the present invention.

FIG. 4 is a detailed diagram of a configuration of the lens array apparatus 7 according to the first embodiment, as described above, in which focus is placed only on a corresponding set of lens 11, VCSEL 16, and optical fiber 19, to simplify explanation.

As shown in FIG. 4, the lens array apparatus 7 according to the embodiment is formed such that, when the ambient temperature of the lens array apparatus 7 is a normal temperature ($T_1[° C.]$ in FIG. 4), serving as a predetermined ambient temperature, the VCSEL 16 is formed (placed) such as to be displaced in the array direction from the center axis 12 (under the normal temperature $T_1$) of the lens 11 by a predetermined displacement amount $\Delta d[mm]$ in a heat expansion direction (to the right in FIG. 4) of the lens array 8. A specific normal temperature can be variably selected based on concept. In the lens array 8 according to the first embodiment, the heat expansion direction is a direction from a center section of the lens array 8 in the array direction towards both end sections on the left and the right.

As a result, when the ambient temperature of the lens array apparatus 7 is the normal temperature ($T_1[° C.]$ in FIG. 4), after the light emitted from the VCSEL 16 passes through the lens 11 corresponding to the VCSEL 16 and the light is emitted towards a converging point P1 as an outgoing light $L_1$ from the lens surface 11b on the light-exiting side of the lens 11, the exiting direction of the outgoing light $L_1$ is at an angle of gradient A in relation to the thickness direction.

Then, when the ambient temperature changes from the normal temperature to a high temperature ($T_2[° C.]$ in FIG. 4, where $T_2>T_1$) the lens array 8 expands in the heat expansion direction (to the right in FIG. 4) as a result of heat expansion reflecting a coefficient of linear expansion a of the material. As a result, a diameter of the lens 11 increases and the center axis 12 is displaced in the heat expansion direction. According to the first embodiment, the coefficient of linear expansion of the material forming the semiconductor substrate 15 is the same as the coefficient of linear expansion a of the material forming the lens array 8. Therefore, according to the first embodiment, when the lens 11 is displaced in accompaniment with the heat expansion of the lens array 8, the VCSEL 16 formed on the semiconductor substrate 15 is displaced by almost the same displacement amount in the same direction as the lens 11 in accompaniment with the heat expansion of the semiconductor substrate 15.

When the ambient temperature becomes a high temperature in this way, the light emitted from the VCSEL 16 passes through the lens 11 (the lens 11 under the high temperature) that has undergone heat expansion from a state under the normal temperature and is then emitted towards a converging point $P_2$ under the high temperature, as an outgoing light $L_2$ under the high temperature, from the lens surface 11b on the light-exiting side (under the high temperature $T_2$).

At this time, the exiting direction of the outgoing light $L_2$ under the high temperature is at the angle of gradient θ in relation to the thickness direction, similar to the outgoing light $L_1$ under the normal temperature.

At this time, the converging point $P_2$ under the high temperature is farther away from the lens surface 11b than the converging point $P_1$ under the normal temperature because of the effect of coefficient of temperature dependence of refractive index dn/dT of the material forming the lens array 8.

As a result, as shown in FIG. 4, the converging point $P_1$ under the normal temperature and the converging point $P_2$ under the high temperature are positioned on a straight line 23 that is parallel with the thickness direction.

Therefore, as shown in FIG. 4, when the optical fiber 19 is formed such that the center of the end surface 19a of the optical fiber 19 is positioned on the straight line 23, the light emitted from the VCSEL 16 can be appropriately coupled with the optical fiber 19, regardless of whether the ambient temperature is the normal temperature or the high temperature. The converging point $P_2$ under the high temperature is displaced in the thickness direction from the end surface 19a of the optical fiber 19. However, displacement, such as this, in the thickness direction has significantly less influence on optical performance compared to when the converging point $P_2$ under the high temperature is misaligned in the array direction with the converging point $P_1$ under the normal temperature. The displacement in the thickness direction is sufficiently allowable under practice.

In FIG. 4, two ambient temperatures, the normal temperature and the high temperature, are given as the ambient temperatures. However, even under a predetermined low temperature (such as $T_3[° C.]$) that is lower than the normal temperature, the converging point of the outgoing light from the lens surface 11b can be positioned on the straight line 23. Based on the lens 11 under the normal temperature, the diameter of the lens 11 under the low temperature decreases as a result of heat contraction from the state under the normal temperature. The center axis 12 is displaced in a direction (to the left in FIG. 4) counter to the heat expansion direction from the state under the normal temperature. Even under ambient temperatures other than the normal temperature $T_1$[° C.], the high temperature $T_2$[° C.], and the low temperature $T_3$[° C.], the converging point of the outgoing light from the lens 11 under each ambient temperature can be positioned on the straight line 23. Furthermore, a trajectory of the converging points of the outgoing light from each lens 11 accompanying the change in ambient temperature of the lens array apparatus 7 can form a line segment on the straight line 23 that is parallel to the thickness direction and corresponds to each lens 11.

Therefore, according to the first embodiment, the converging point of the outgoing light from each lens 11 in the lens array 8 can be positioned on the straight line 23 corresponding to each lens 11 under a plurality of ambient temperatures. Therefore, regardless of changes in the ambient temperature (such as from the normal temperature $T_1$[° C.] to the high temperature $T_2$[° C.], the VCSEL 16 and the optical fiber 19 can be appropriately coupled.

Moreover, the lens array apparatus 7 that can perform an appropriate optical coupling such as this can be actualized at a low cost with a simple configuration in which the position of the VCSEL 16 is displaced in the array direction from the center axis 12 of the lens 11.

Figure 5:
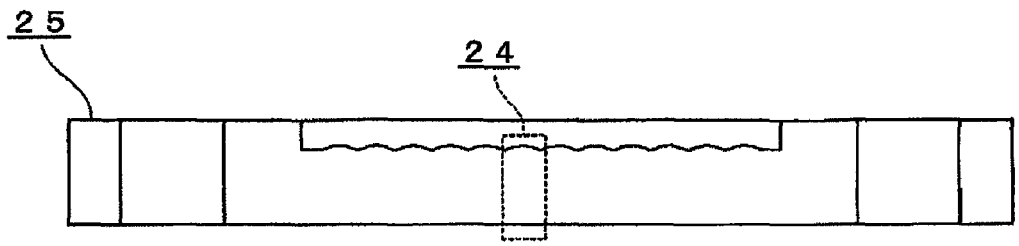
FIG. 5 is a vertical cross-sectional view of an aspect of the lens array differing from that in FIG. 2.

Instead of the lens array 8 shown in FIG. 1 to FIG. 3, a lens array 25 including plano-convex lenses 24 shown in FIG. 5 can be used. In this instance, whether to place the VCSEL 16 such as to face the planar surface or the convex surface of the lenses 24 can be variably changed based on the concept.

(Manufacturing Method of the Lens Array Apparatus)

Figure 6:
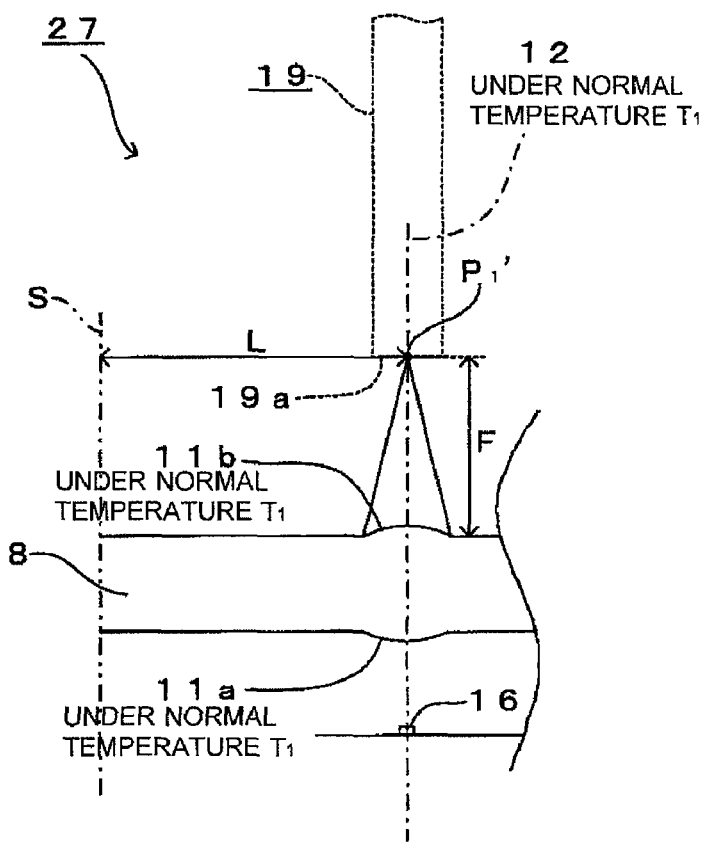
FIG. 6 is an explanatory diagram of procedures performed to prepare a design lens array apparatus in a manufacturing method of the lens array apparatus according to the first embodiment of the present invention.

To manufacture the lens array apparatus according to the first embodiment, first, as shown in FIG. 6, as a lens array apparatus for design used to design the lens array apparatus 7 according the first embodiment, a lens array apparatus 27 is prepared as a design lens array apparatus 27 used for designing the lens array apparatus 7 according to the first embodiment. In the lens array apparatus 27, the VCSEL 16 of the light-emitting device 10 are respectively formed on the center axes 12 of the lenses 11 in the lens array 8. The lens array apparatus 27 can be a design assumption.

At this time, the coefficient of linear expansion a and the coefficient of linear dependence of refractive index dn/dT of the material used to form the lens array 8 in the design lens array apparatus 27 are grasped.

Next, under the normal temperature $T_1$[° C.] serving as the predetermined ambient temperature, a distance L[mm] in the array direction from a reference surface S to the center axis 12 is measured for each lens 11 (only one lens is shown in FIG. 6 to simplify explanation). The reference surface S is a surface taken from the lens array 8 that is perpendicular to the array direction. The reference surface S can also be taken from a center section of the lens array 8 in the array direction.

At this time, through simulation, a converging point $P_1'$ of the outgoing light from each lens 11 regarding the light entering each lens 11 from each VCSEL 16 is determined. In FIG. 6, the position of the converging point $P_1'$ is indicated as a focal distance F[mm] on the optical fiber 19 side of the lens 11. In FIG. 6, the converging point $P_1'$ is positioned at a center point of the end surface 19*a* of the optical fiber 19.

Figure 7:
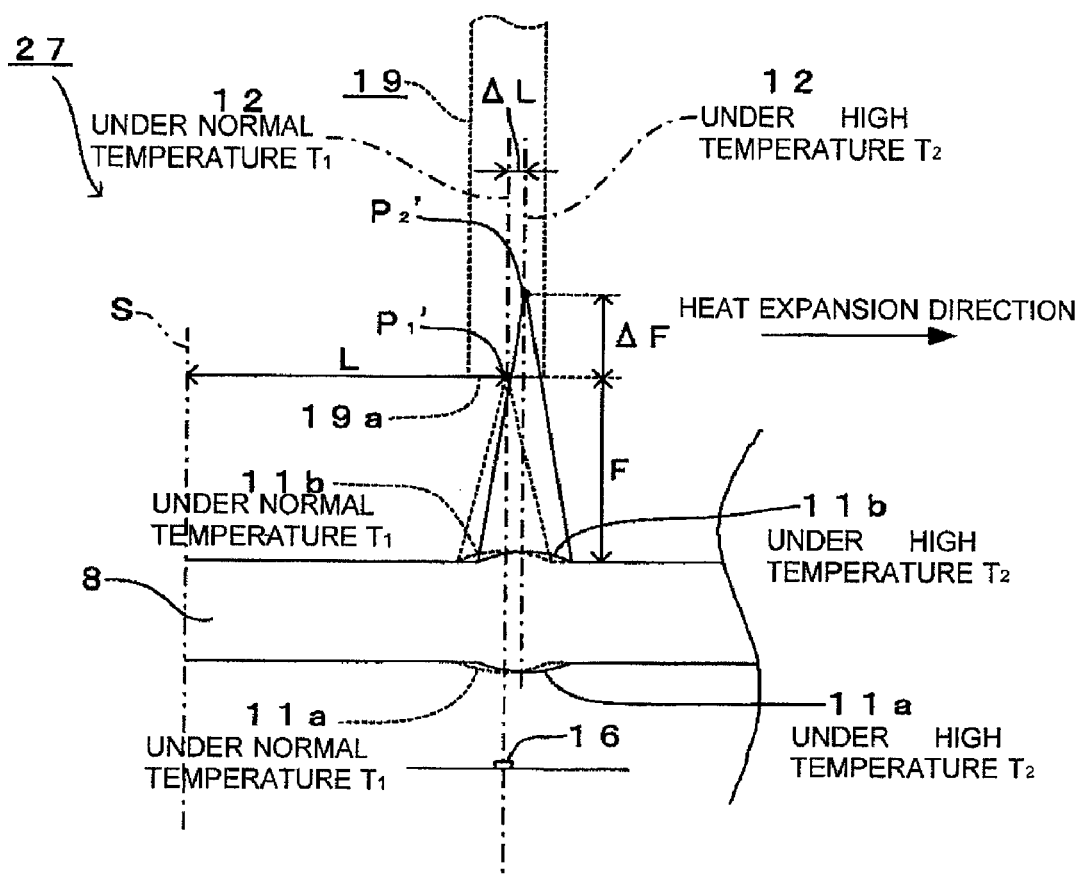
FIG. 7 is an explanatory diagram of a procedure performed to simulate displacement of a center axis and a converging point accompanying heat expansion in the manufacturing method of the lens array apparatus according to the first embodiment of the present invention.

Next, in the design lens array apparatus 27, it is assumed that the ambient temperature has changed from the normal temperature $T_1$[° C.] to the high temperature $T_2$[° C.], as shown in FIG. 7.

At this time, as shown in FIG. 7, an amount of change $\Delta L$[mm] in the distance in the array direction between the reference surface S and the center axis 12 of the lens 11 accompanying the change in temperature from the normal temperature $(T_2 - T_1)$ is determined for each lens 11. The amount of change $\Delta L$[mm] can be determined based on the coefficient of linear expansion a of the material forming the lens array 8.

In addition, at this time, as shown in FIG. 7, an amount of change in the position of the converging point of the lens 11 accompanying the change in temperature from the normal temperature $(T_2 - T_1)$ is determined for each lens 11. In FIG. 7, the converging point changes from $P_1'$ to $P_2'$ as a result of the change in temperature from the normal temperature. However, the change in the position of the converging point is determined as an amount of change $\Delta F$[mm] in the focal distance.

Figure 8:
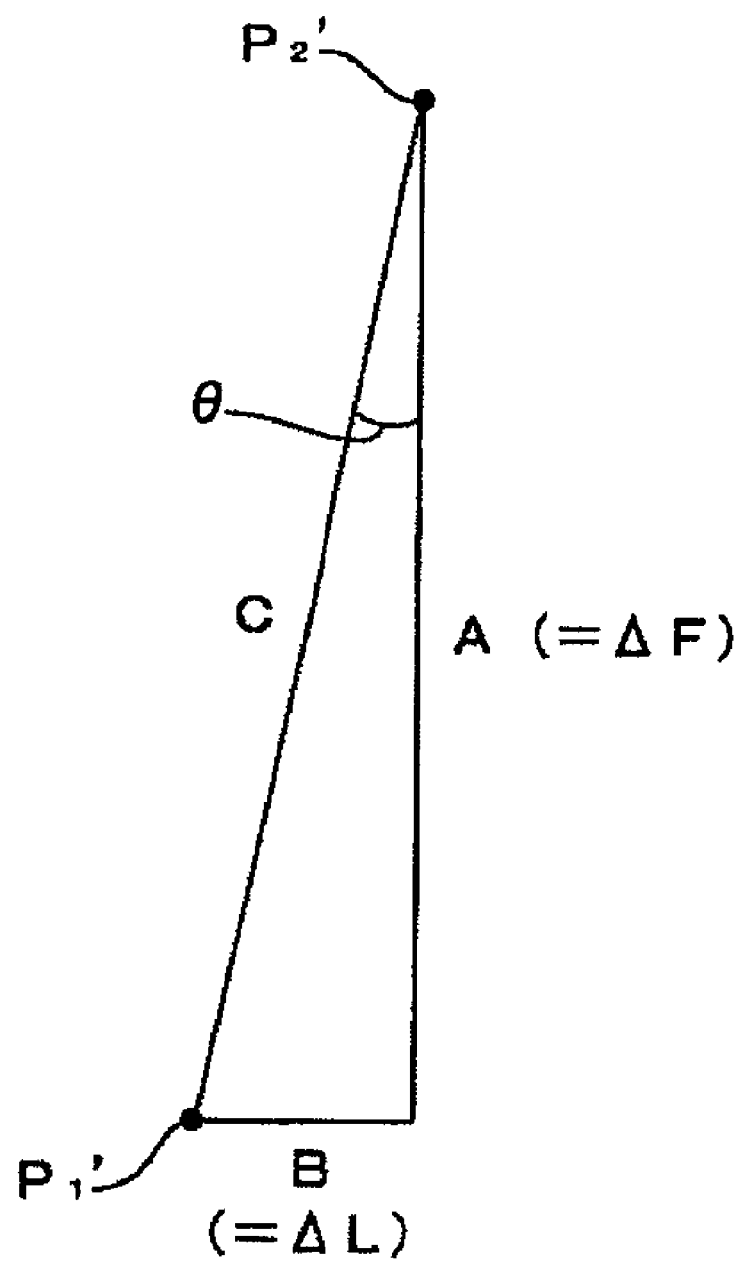
FIG. 8 is an explanatory diagram of a procedure performed to calculate an angle of gradient obtained from the simulation in FIG. 7 in the manufacturing method of the lens array apparatus according to the first embodiment of the present invention.

Next, as shown in FIG. 8, regarding each lens 11, a right triangle is assumed of which two sides are a first side A and a second side B. The first side A is parallel with the thickness direction and has a length equivalent to the amount of change $\Delta F$[mm] in the position of the converging point. The second side B is parallel with the array direction and has a length equivalent to the amount of change $\Delta L$[mm] in the distance of the center axis 12 of the lens 11. An angle formed by a hypotenuse C of the right triangle and the thickness direction is determined for each lens 11.

Figure 9:
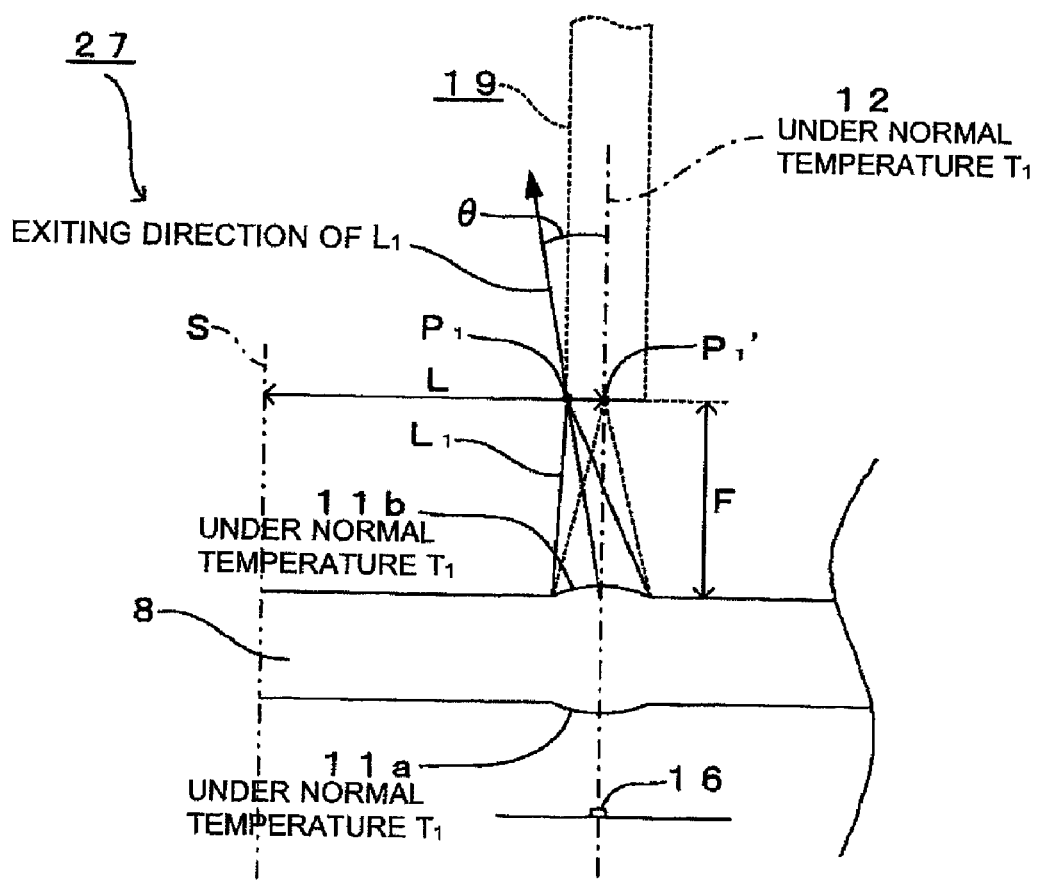
FIG. 9 is an explanatory diagram of a procedure performed to define outgoing light in the manufacturing method of the lens array apparatus according to the first embodiment of the present invention.

Next, as shown in FIG. 9, the following is defined as the outgoing light $L_1$ from each lens 11. The exiting direction of the outgoing light $L_1$ is at an angle θ (in other words, the angle of gradient), determined in FIG. 8 for each lens 11, in relation to the thickness direction, towards the direction (to the left in FIG. 9) in the array direction counter to the heat expansion direction of the lens array 8. The outgoing light $L_1$ can also be defined as light of which the center axis passes through a center of curvature of the lens 11*b* on the light-exiting side. The outgoing light $L_1$ is equivalent to the outgoing light $L_1$ under the normal temperature of the lens array apparatus 7 shown in FIG. 4.

Figure 10:
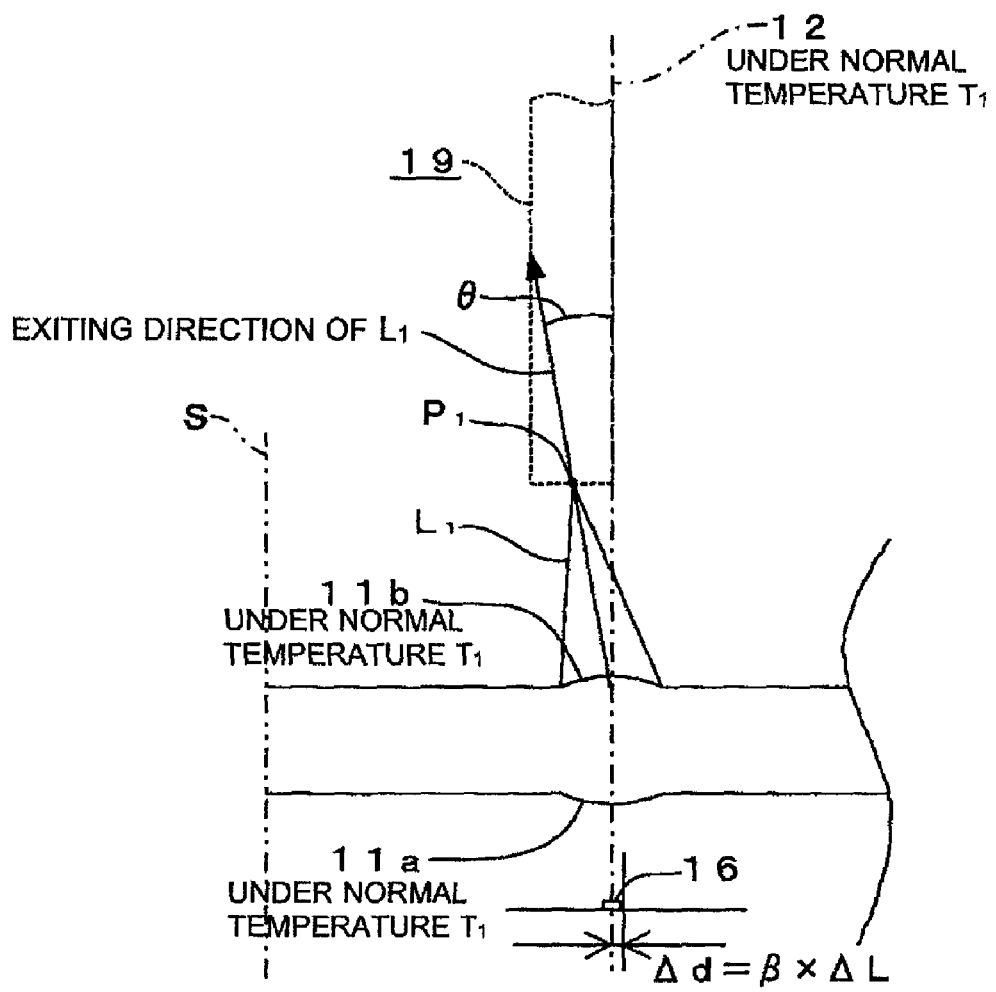
FIG. 10 is an explanatory diagram of a procedure performed to determine displacement of a light-emitting section in the manufacturing method of the lens array apparatus according to the first embodiment of the present invention.

Next, as shown in FIG. 10, as a physical amount specifying the position of the VCSEL 16 that can emit the outgoing light $L_1$ defined in FIG. 9, a displacement amount [mm] of the VCSEL in the array direction from the center axis 12 of the lens 11 is determined. The displacement amount can be calculated by simulation. Alternatively, with β as the magnification of the lens 11, the displacement amount can be approximated by $\beta \times \Delta L$. When the displacement amount is determined by $\beta \times \Delta L$, the displacement amount is $\Delta L$[mm] when the lens 11 is magnified by one.

The lens array apparatus 7 according to the first embodiment, shown in FIG. 4, can be manufactured as a result of the lens array apparatus 7 being designed such that each VCSEL 16 is arranged to be displaced by the displacement amount Δd, determined as described above, and the center section of the end surface 19*a* of the optical fiber 19 matches the converging point $P_1$ of the outgoing light $L_1$.

Second Embodiment

A lens array apparatus and a manufacturing method thereof according to a second embodiment of the present invention will be described with reference to FIG. 11 and FIG. 12.

Sections of which the basic configuration is the same as or similar to that according to the first embodiment are explained using the same reference numbers.

(Configuration of the Lens Array Apparatus)

Figure 11:
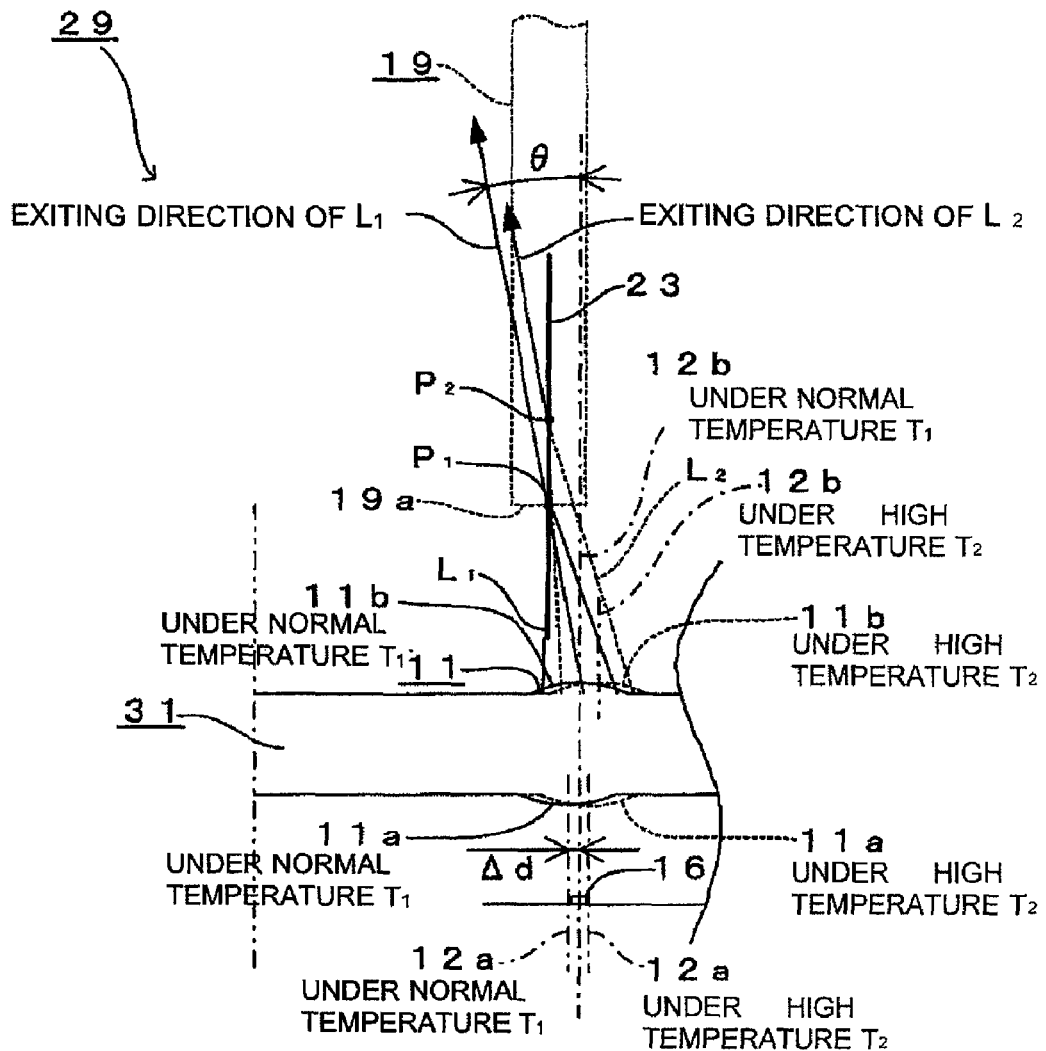
FIG. 11 is an explanatory diagram of main components of a lens array apparatus according to a second embodiment of the present invention.
Figure 12:
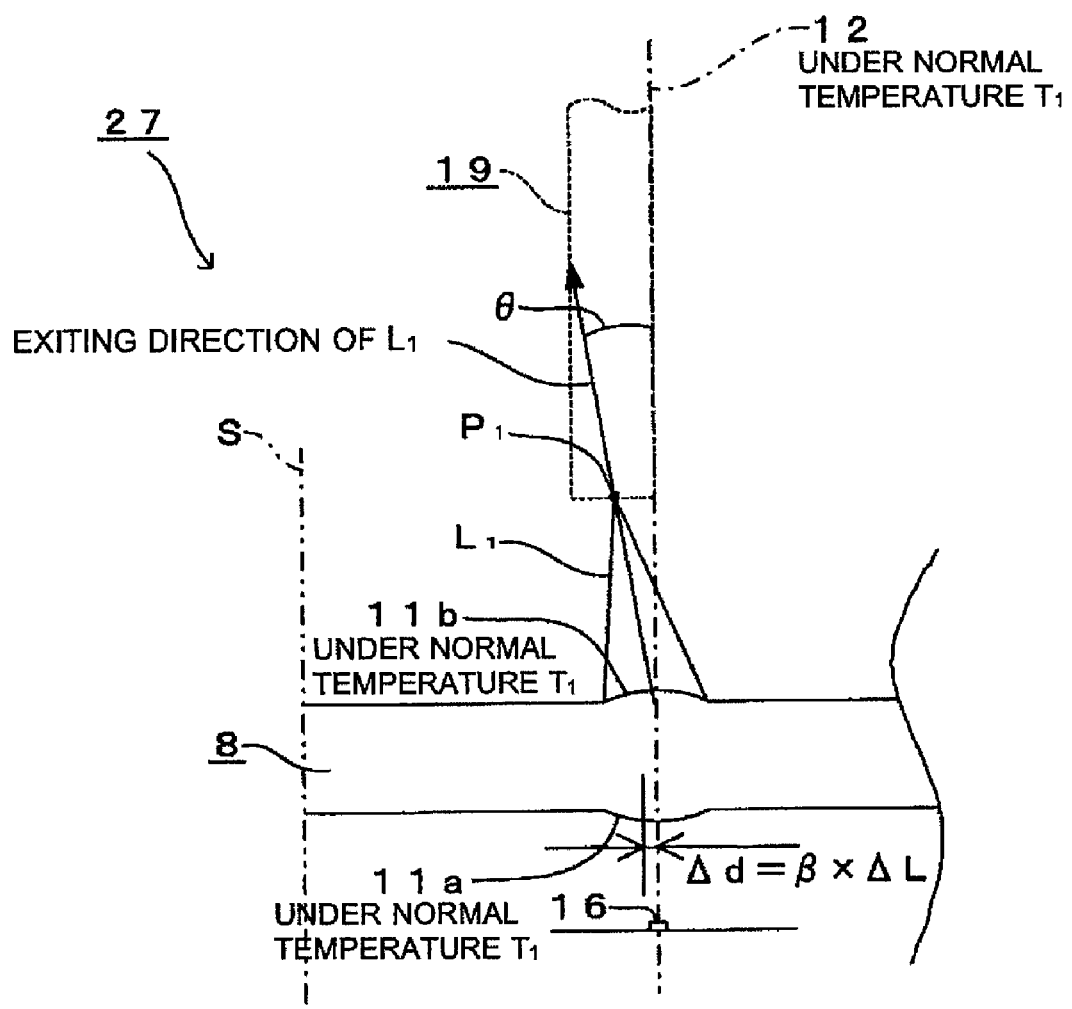
FIG. 12 is an explanatory diagram of a procedure performed to determine displacement of a center axis of a lens surface in a manufacturing method of the lens array apparatus according to the second embodiment of the present invention.

FIG. 11 is a detailed diagram similar to FIG. 4, in which focus is placed only on a corresponding set of lens 11, VCSEL 16, and optical fiber 19 as main components of a lens array apparatus 29 according to the second embodiment. The configuration shown in FIG. 11 applies to all sets of lens 11, VCSEL 16, and optical fiber 19.

As shown in FIG. 11, the lens array apparatus 29 according to the second embodiment is similar to that according to the first embodiment in that, as a predetermined angle of gradient in relation to the thickness direction, an exiting direction of the light ($L_1$ and $L_2$ in FIG. 11) emitted from the lens 11 in a lens array 31 is at an angle of gradient $\theta[°]$ allowing converging points ($P_1$ and $P_2$ in FIG. 11) of the outgoing light to be positioned on the predetermined straight line 23 that is parallel with the thickness direction, under a plurality of different ambient temperatures ($T_1$ and $T_2$ [° C.] in FIG. 11).

However, the lens array apparatus 29 according to the second embodiment slightly differs from that according to the first embodiment regarding a further detailed means of actualizing the angle of gradient $\theta[°]$ of the exiting direction of the outgoing light described above.

In other words, according to the second embodiment, as shown in FIG. 11, the lens array apparatus 29 is formed such that the exiting direction of the outgoing light is at the angle of gradient $\theta[°]$ by being formed such that a predetermined displacement amount $\Delta d[mm]$ in the array direction is present between a center axis 12a of the lens surface 11a on the light-entering side and a center axis 12b of the lens surface 11b on the light-exiting side. In FIG. 11, the VCSEL 16 is positioned on the center axis 11b of the lens surface 11b on the light-exiting side. The center axis 11a of the lens surface 11a on the light-entering side is displaced to the left (the direction counter to the heat expansion direction) in the array direction by the displacement amount $\Delta d$ from the VCSEL 16.

As shown in FIG. 11, even in the lens array apparatus 29 according to the second embodiment, configured as described above, the converging points $P_1$ and $P_2$ of the outgoing light $L_1$ and $L_2$ from the lens 11 can be positioned on the predetermined straight line 23 that is parallel with the thickness direction, under a plurality of ambient temperatures, such as the normal temperature ($T_1$[° C.]) and the high temperature ($T_2$[° C.]).

Therefore, according to the second embodiment as well, the converging point of the outgoing light from each lens 11 in the lens array 31 can be positioned on the straight line 23 corresponding to each lens 11, under a plurality of ambient temperatures. The VCSEL 16 and the optical fiber 19 can be appropriately optically coupled, regardless of the change in ambient temperature.

Other configurations are similar to those according to the first embodiment. Explanations thereof are omitted.

(Manufacturing Method of the Lens Array Apparatus)

To manufacture the lens array apparatus 29 according to the second embodiment, as shown in FIG. 6, a design lens array apparatus 27 similar to that according to the first embodiment is presumed. In other words, the lens array apparatus 27 is presumed including a design lens array 8 in which the center axis 12 of the lens surface 11a on the light-entering side and the center axis 12 of the lens surface 11b on the light-exiting side match.

After procedures shown in FIG. 6 to FIG. 9 are performed on the design lens array apparatus 27 such as that described above, as shown in FIG. 12, the displacement amount $\Delta d$ of the center axis having a predetermined displacement amount [mm] allowing the angle $\theta[°]$ determined by the procedure in FIG. 9 is determined. According to the second embodiment, as the displacement amount $\Delta d$ of the center axis, the displacement amount $\Delta d$ of the center axis 12a of the lens surface 11a on the light-entering side in the array direction from the center axis 12 in the design lens array 8 is determined.

The displacement amount $\Delta d$ according to the second embodiment can also be approximated by $\beta \times \Delta L$ as according to the first embodiment.

The lens array 31 according to the second embodiment in which the displacement amount $\Delta d$ is present between the center axes of the lens surface 11a and the lens surface 11b is designed by the positional relationship between the center axis 12 of the lens surface 11a on the light-entering side and the center axis 12 of the lens surface 11b on the light-exiting side in the design lens array 8 being adjusted. The lens array apparatus 29 according to the second embodiment is manufactured by the lens array 31 being formed in adherence to the design result.

Third Embodiment

A lens array apparatus and a manufacturing method thereof according to a third embodiment of the present invention will be described with reference to FIG. 13 and FIG. 14.

Sections of which the basic configuration is the same as or similar to that according to the first embodiment are explained using the same reference numbers.

(Configuration of the Lens Array Apparatus)

Figure 13:
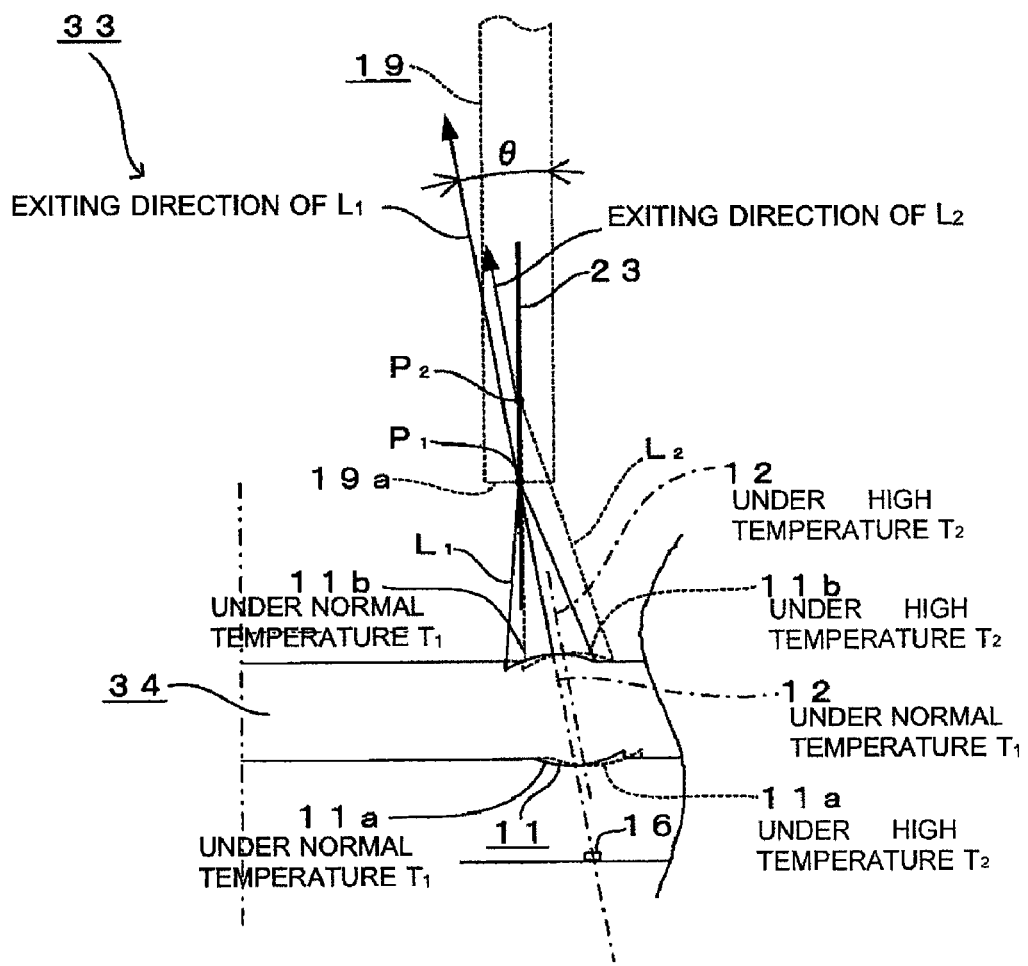
FIG. 13 is an explanatory diagram of main components of a lens array apparatus according to a third embodiment of the present invention.
Figure 14:
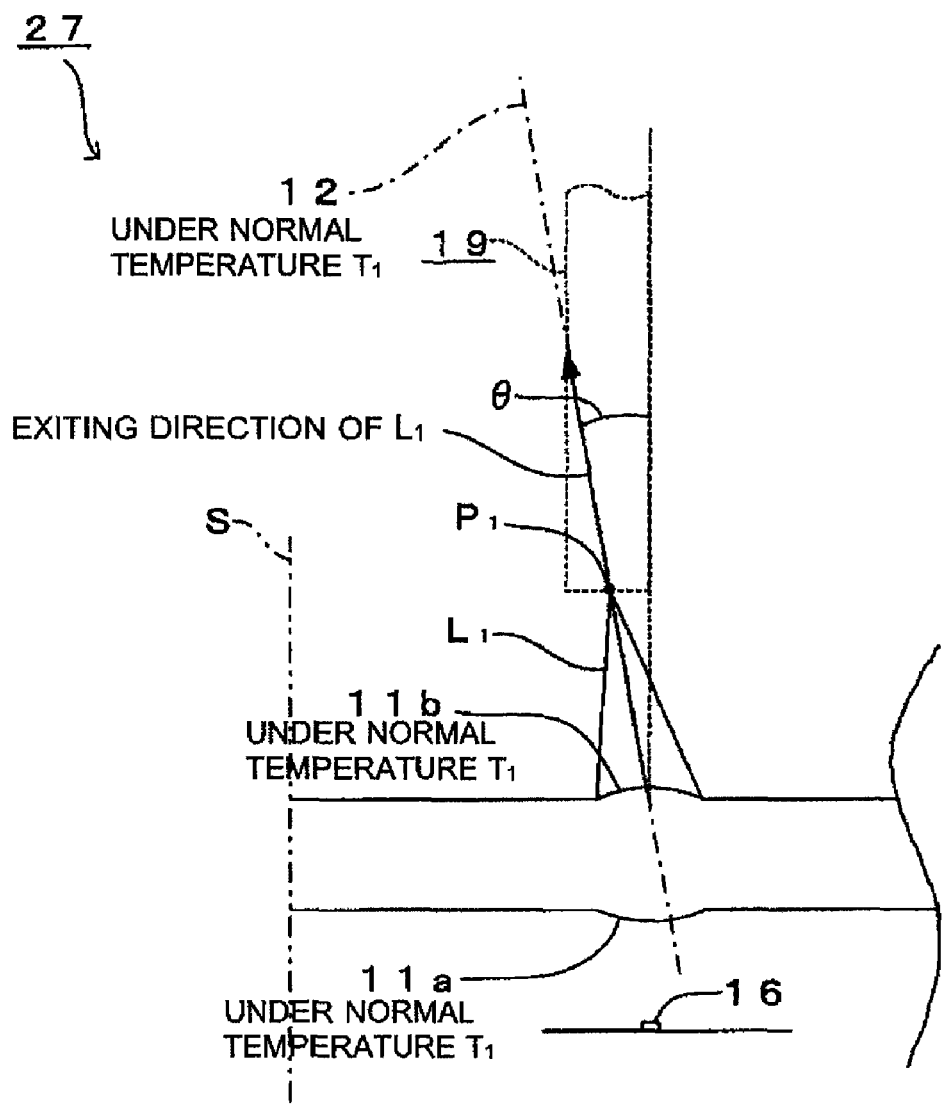
FIG. 14 is an explanatory diagram of a procedure performed to adjust an angle of a center axis of a lens surface in a manufacturing method of the lens array apparatus according to the third embodiment of the present invention.
Figure 15:
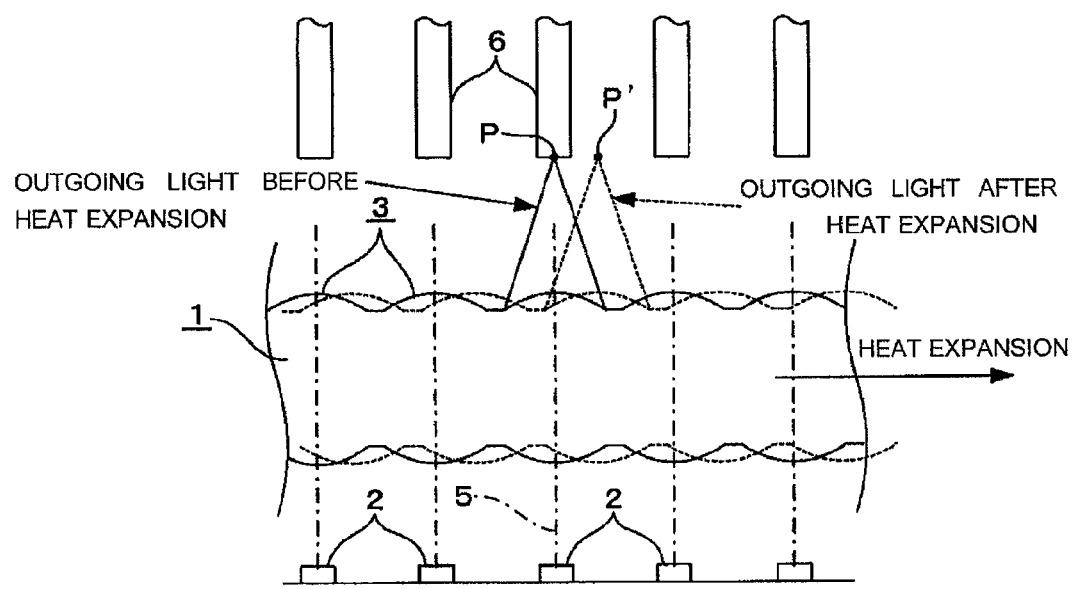
FIG. 15 is a configuration diagram of an example of a conventional lens array apparatus.

FIG. 13 is a detailed diagram similar to FIG. 4, in which focus is placed only on a corresponding set of lens 11, VCSEL 16, and optical fiber 19 as main components of a lens array apparatus 33 according to the third embodiment. The configuration shown in FIG. 13 applies to all sets of lens 11, VCSEL 16, and optical fiber 19.

As shown in FIG. 13, the lens array apparatus 33 according to the third embodiment is similar to those according to the first embodiment and the second embodiment in that, as a predetermined angle of gradient in relation to the thickness direction, an exiting direction of the light ($L_1$ and $L_2$ in FIG. 13) emitted from the lens 11 in a lens array 34 is at an angle of gradient $\theta[°]$ allowing converging points ($P_1$ and $P_2$ in FIG. 13) of the outgoing light to be positioned on the predetermined straight line 23 that is parallel with the thickness direction, under a plurality of different ambient temperatures ($T_1$ and $T_2$ [° C.] in FIG. 13).

However, the lens array apparatus 33 according to the third embodiment slightly differs from those according to the first embodiment and the second embodiment regarding a further detailed means of actualizing the angle of gradient $\theta[°]$ of the exiting direction of the outgoing light described above.

In other words, according to the third embodiment, as shown in FIG. 13, the center axis 12 of the lens 11 is at an angle of gradient $\theta[°]$ in relation to the thickness direction.

As shown in FIG. 13, even in the lens array apparatus 33 according to the third embodiment, configured as described above, the converging points $P_1$ and $P_2$ of the outgoing light $L_1$ and $L_2$ from the lens 11 can be positioned on the predetermined straight line 23 that is parallel with the thickness direction, under a plurality of ambient temperatures, such as the normal temperature ($T_1$[° C.]) and the high temperature ($T_2$[° C.]).

Therefore, according to the third embodiment as well, the converging point of the outgoing light from each lens 11 in the lens array 34 can be positioned on the straight line 23 corresponding to each lens 11, under a plurality of ambient temperatures. The VCSEL 16 and the optical fiber 19 can be appropriately optically coupled, regardless of the change in ambient temperature.

Other configurations are similar to those according to the first embodiment. Explanations thereof are omitted.

(Manufacturing Method of the Lens Array Apparatus)

To manufacture the lens array apparatus 33 according to the third embodiment, as shown in FIG. 6, a design lens array apparatus 27 similar to that according to the first embodiment is presumed. In other words, the lens array apparatus 27 is presumed including a design lens array 8 in which the center axis 12 of the lens 11 is parallel with the thickness direction.

After procedures shown in FIG. 6 to FIG. 9 are performed on the design lens array apparatus 27 such as that described above, as shown in FIG. 14, the lens array 34 according to the third embodiment is designed by the angle of the center axis 12 of the lens 11 in relation to the thickness direction being adjusted such that the center axis 12 of the lens 11 is at an the angle θ[°] determined by the procedure in FIG. 9. The lens array apparatus 34 according to the third embodiment is manufactured by the lens array 34 being formed in adherence to the design result.

As described above, the present invention is configured such that the converging point of light emitted from each lens 11 in the lens array 8, the lens array 31, and the lens array 34 is positioned on the straight line 23 corresponding to each lens 11. Therefore, appropriate optical performance can be achieved regardless of changes in ambient temperature.

The present invention is not limited to the above-described embodiments. Various modifications can be made as required.

For example, according to the above-described embodiments, the optical fiber 19 is disposed as the optical device on the light-exiting side of the lens array 8. However, the present invention is not limited to a configuration such as this. For example, instead of the optical fiber 19, a light-receiving device, such as a photodetector, including a plurality of light-receiving elements corresponding with the lenses 11 can be disposed. Even in an instance such as this, optical coupling efficiency between the light-emitting device 10 and the light-receiving device can be favorably maintained. The light-emitting device can also be a device in which the light-emitting elements are formed in an array, other than the VCSEL 16.

The main components of the present invention can be applied to an optical device other than the lens array apparatus, such as an optical device including a lens and a light-emitting device disposed in a position facing the lens in the thickness direction. A light-emitting element is formed in the light-emitting device from which light is emitted towards the lens. In other words, an optical device such as this can be configured such that, as a predetermined angle of gradient in relation to the thickness direction, the exiting direction of light from the lens is at an angle of gradient allowing the converging point of the light emitted from the lens to be positioned on a predetermined straight line that is parallel with the thickness direction, under a plurality of different ambient temperatures. As a result, in a manner similar to that of the lens array apparatus, appropriate optical performance can be achieved regardless of changes in ambient temperature.

What is claimed is:

1. A lens array apparatus consisting of:
a lens array including a plurality of lenses formed to be arrayed in a predetermined array direction and formed integrally to have a predetermined thickness in a thickness direction that is perpendicular to the array direction, the lens array emitting light, that has entered the plurality of lenses and corresponds to each lens, from each lens towards a predetermined converging point;
a light-emitting device that is disposed in a position facing the lens array in the thickness direction of the lenses and on which a plurality of light-emitting elements of a same number as a number of lenses are formed, the light-emitting elements respectively emitting light corresponding to each lens towards the plurality of lenses; and
a same number of plurality of optical fibers as a number of the lenses disposed in a position facing a side of the lens array opposing the light emitting device in the thickness direction of the lenses so that light emitted from each of the lenses enters each of the optical fibers, wherein
each of the plurality of lenses has
a first lens surface which is on a light-entering side facing the light-emitting device, and
a second lens surface which is on a light-exiting side opposing the light-entering side and faces each of the optical fibers; and
as a predetermined angle of gradient in relation to the thickness direction of each lens, an exiting direction of light from each of the plurality of lenses is at an angle of gradient allowing a converging point of the light emitted from each lens to be positioned on a predetermined straight line that corresponds to each lens and is parallel in the thickness direction of the lens, under a plurality of different ambient temperatures.

2. The lens array apparatus according to claim 1, wherein center axes of the plurality of lenses are respectively formed parallel in the thickness direction of the lenses, and
the exiting direction of the light is at the angle of gradient of each of the plurality of light-emitting elements formed to be displaced by a predetermined displacement amount in the array direction from a center axis of each of the plurality of lenses.

3. The lens array apparatus according to claim 1, wherein the exiting direction of the light is at the angle of gradient of each of the plurality of lenses formed such that a displacement of a predetermined amount in the array direction is present between a center axis of the first lens surface on the light-entering side and a center axis of the second lens surface on the light-exiting side.

4. The lens array apparatus according to claim 1, wherein the exiting direction of the light is at the angle of gradient of each center axis of the plurality of lenses formed at the angle of gradient in relation to the thickness direction.

* * * * *